(No Model.)

D. F. BRUNNEY.
CIDER MILL AND PRESS.

No. 490,335. Patented Jan. 24, 1893.

Witnesses

Inventor
Daniel F. Brunney.
By his Attorneys,

UNITED STATES PATENT OFFICE.

DANIEL F. BRUNNEY, OF LANCASTER, OHIO, ASSIGNOR OF ONE-HALF TO MARK W. BRINDLE AND CHARLES E. REESE.

CIDER MILL AND PRESS.

SPECIFICATION forming part of Letters Patent No. 490,335, dated January 24, 1893.

Application filed April 28, 1892. Serial No. 430,977. (No model.)

*To all whom it may concern:*

Be it known that I, DANIEL F. BRUNNEY, a citizen of the United States, residing at Lancaster, in the county of Fairfield and State of Ohio, have invented a new and useful Cider Mill and Press, of which the following is a specification.

This invention relates to cider mills; and it has for its object to provide an improved mill of this character which will not only rapidly grind and squeeze the apples, but at the same time provides means whereby the juice is thoroughly extracted from the apples in a more simple and effective manner than machines of this character ordinarily in use. To this end it is the main object of the invention to generally improve upon machines of this character.

With these and many other objects in view which will readily appear as the nature of the invention is better understood, the same consists in the novel construction, combination and arrangement of parts hereinafter more fully described, illustrated and claimed.

Figure 1:
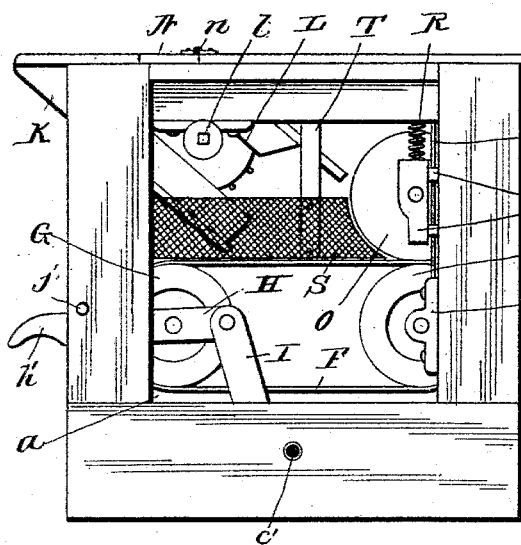
Figure 2:
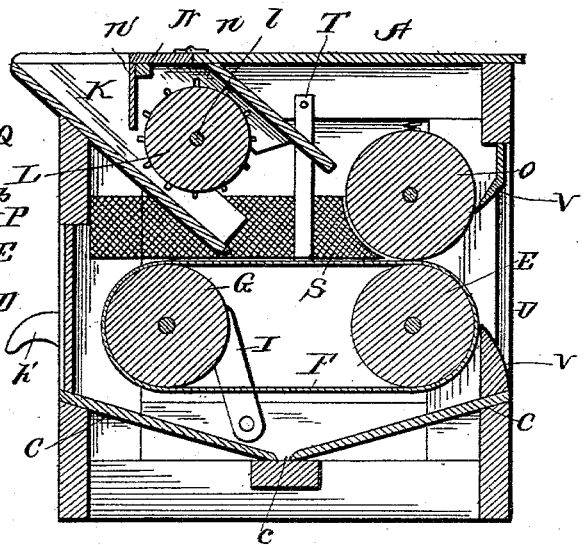
Figure 3:
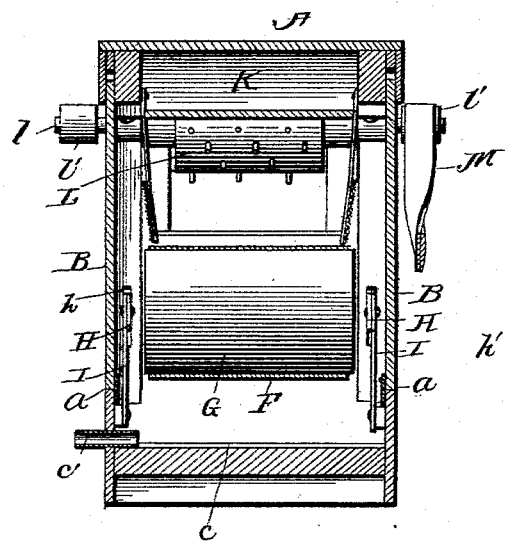
Figure 4:
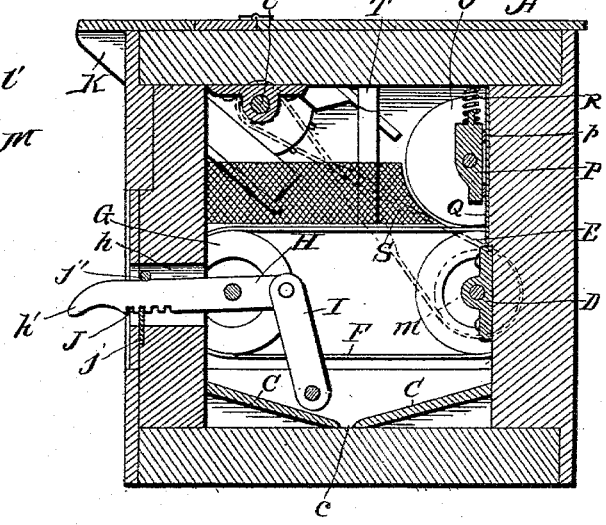

In the accompanying drawings;—Figure 1 is a side elevation of a cider mill constructed in accordance with this invention, one side being removed. Fig. 2 is a vertical longitudinal sectional view of the same. Fig. 3 is a vertical transverse sectional view. Fig. 4 is a vertical longitudinal sectional view through one side of the mill.

Referring to the accompanying drawings;—A represents the casing having the opposite side openings $a$, inclosed by the removable sides B which provide for ready access to the interior of the mill for repairing or cleaning the same. The bottom of the casing A is provided with the opposite inclined portion C, terminating in a trough $c$, from which the juice squeezed from the apples, is drawn through the spout $c'$, projecting through one side of the casing. Journaled in the stationary bearings D at one side of the opposite openings $a$ near one end and the bottom of the casing is the fixed belt roller E, over which passes one end of the endless belt F, the other end of which passes over the longitudinally movable belt tightening roller G. The said belt tightening roller G has its journal ends thereof journaled in the opposite adjusting bars H, working through the opposite openings $h$, in opposite sides of and at one end of the casing and terminating without the casing in operating handles $h'$. The inner ends of said adjusting bars H are pivoted to the upper ends of the swinging supporting links I, the lower ends of which are pivoted to the bottom and opposite sides of the casing to allow for longitudinal movement of said bars to adjust said roller to regulate the tension of the belt F. The said adjusting bars H are provided with a series of adjusting notches J in the bottom edges thereof which are designed to engage the locking studs $j$, projecting within the opposite end openings $h$ in said casing, and said bars are held into locking engagement with said studs by the locking pins $j'$, removably engaging the sides of the casing through the openings $h$ over the top of said bars. The said endless belt F is of any suitable straining material through which the juice of the apples will pass and is not only designed to convey the apples through the mill, but also to allow the juice to strain to the trough in the bottom of the casing.

An inclined hopper K is formed at one end of the casing A and projects over one end of the endless conveying and straining belt F. The said hopper K accommodates the toothed crushing and feeding roller L working therein above one end of the belt F, and designed to crush and grind the apples fed into the hopper and to force the same upon the endless belt. The said crushing or grinding roller L is mounted upon the shaft $l$, journaled in suitable bearings in said casing and provided at each end with the belt pulleys $l'$, one of which is connected with suitable driving machinery. The other pulley receives the cross belt M passing therefrom over the pulley $m$ connected with the fixed belt roller E and thus providing means for simultaneously revolving the crushing and feeding roller and said endless belt. A hinged drop door N is hinged at $n$ to the top of the casing and is provided with a depending vertical wall $n'$, forming one wall of the hopper K, and serving to direct the apples beneath the crushing roller, while at the same time when the said door is thrown back from over the crushing roller the said roller is exposed so as to be readily and easily cleaned.

The apples pass from the feeding and crushing roller L to the endless belt through which the juice squeezed from the apples passes to the bottom of the casing. The belt carries the crushed apples to the opposite end of the casing and under the spring pressed pressure roller O, normally pressed down upon and working over the fixed belt roller E, and serves to squeeze the remaining juice from the apples, and force the same through the belt to the bottom trough. The said pressure roller O has the spindle ends thereof journaled in the adjustable sliding bearing blocks P. The said sliding bearing blocks P are provided with the guide flanges $p$, embracing opposite edges of the vertical guide strips Q, secured at one side of the opposite openings $a$ directly over the stationary bearings D, and said bearing blocks or boxes work against the tension of the pressure springs R connected to the top of said sliding bearing blocks or boxes and the top of the casing, so as to normally hold the pressure roller in contact with the endless belt directly over the stationary belt roller E, which communicates motion to said pressure roller.

In order to confine the crushed apples upon the endless belt from the feeding hopper to the spring pressed pressure roller I employ the opposite side fenders S, arranged over opposite edges of the belt from the hopper to the pressure roller. The said fenders are of any suitable screen material and are supported in position upon the lower ends of the supporting arms T secured to opposite inner sides of the casing.

It will be seen from the construction described that the apples are thoroughly ground and crushed and the juice entirely extracted therefrom, so that the crushed apples after leaving the pressure roller O pass through the rear discharge opening U thoroughly crushed and squeezed. Arranged at the top and bottom of the rear discharge opening are the scraper strips V, arranged to scrape the rear end of the endless belt and the pressure roller so as to prevent the crushed and squeezed apple pulp passing back into the mill.

Having thus described my invention, what I claim and desire to secure by Letters Patent is:—

1. In a cider mill, the combination with the casing having opposite removable sides, of a fixed belt roller mounted at one end and near the bottom of said casing, swinging roller supports, an opposite horizontally movable belt roller mounted in said swinging supports, means for adjusting said swinging supports, a permeable endless belt working over said rollers, a spring actuated vertically yielding pressure roller normally bearing on the belt directly over the fixed belt roller, a toothed feeding roller journaled over the other end of the belt, vertical supporting arms secured at their upper ends to the top inner sides of the casing, and horizontal side fenders secured to the lower ends of said arms and arranged over the opposite edges of the belt between the feeding and pressure rollers, substantially as set forth.

2. In a cider mill, the casing having opposite side and end openings, a fixed belt roller located at one end of said casing, swinging supporting links pivotally secured at their lower ends to the opposite sides of the casing, horizontally adjustable bars working through said end openings and pivotally connected at their inner ends to said swinging links and provided with a series of adjusting notches, locking studs projecting within said end openings and adapted to be engaged by the notches in said bars, a horizontally adjustable belt roller journaled in said opposite adjusting bars, an endless belt passing over said belt rollers and crushing rollers arranged over said endless belt, substantially as set forth.

3. In a cider mill, the inclosing casing, a horizontally arranged endless belt working in said casing, a spring pressed pressure roller normally bearing on one end of said belt, an inclined hopper arranged over the other end of said belt within the casing, a toothed crushing and feeding roller arranged within said hopper, a drop door hinged to the top of the casing and having a depending vertical wall adapted to inclose a portion of the crushing roller to direct the apples thereunder and the opposite screen fenders arranged along opposite edges of said endless belt between the pressure and crushing rollers, substantially as set forth.

In testimony that I claim the foregoing as my own I have hereto affixed my signature in the presence of two witnesses.

DANIEL F. BRUNNEY.

Witnesses:
W. W. HENRY,
J. R. SNYDER.